US00RE45156E

(19) United States
(12) Reissued Patent
Jansen et al.

(10) Patent Number: US RE45,156 E
(45) Date of Reissued Patent: Sep. 23, 2014

(54) DECOUPLER WITH SPRING TRAVEL LIMITER

(71) Applicant: Litens Automotive Partnership, Woodbridge (CA)

(72) Inventors: Christian Jansen, Thornhill (CA); John R. Antchak, Innisfil (CA)

(73) Assignee: Litens Automotive Partnership, Woodbridge (CA)

(21) Appl. No.: 13/665,060

(22) Filed: Oct. 31, 2012

Related U.S. Patent Documents

Reissue of:
(64) Patent No.: 8,047,920
Issued: Nov. 1, 2011
Appl. No.: 12/731,418
Filed: Mar. 25, 2010

U.S. Applications:
(63) Continuation of application No. 10/581,097, filed as application No. PCT/CA2004/002094 on Dec. 9, 2004, now Pat. No. 7,712,592.

(60) Provisional application No. 60/528,225, filed on Dec. 9, 2003.

(51) Int. Cl.
*F16D 23/00* (2006.01)

(52) U.S. Cl.
USPC ..... 464/60

(58) Field of Classification Search
USPC ..... 464/40, 57–60; 192/41 S, 55.1, 55.2, 192/55.5, 56.2; 474/70, 74, 94, 902
See application file for complete search history.

(56) References Cited

U.S. PATENT DOCUMENTS

| | | | | |
|---|---|---|---|---|
| 773,320 | A | 10/1904 | Hasse | |
| 1,935,684 | A * | 11/1933 | Wemp | 464/60 X |
| 2,396,985 | A | 3/1946 | Burrus | |
| 2,551,739 | A | 5/1951 | Harlan | |
| 2,633,953 | A | 4/1953 | Gorske | |
| 2,643,749 | A | 6/1953 | Greenlee | |
| 2,794,524 | A | 6/1957 | Sacchini | |
| 2,829,748 | A | 4/1958 | Sacchini et al. | |
| 2,866,349 | A | 12/1958 | Heckenthom | |
| 2,885,896 | A | 5/1959 | Hungerford, Jr. et al. | |

(Continued)

FOREIGN PATENT DOCUMENTS

| | | | |
|---|---|---|---|
| EP | 1279807 | A1 | 1/2003 |
| JP | 10030450 | A | 2/1998 |

(Continued)

*Primary Examiner* — Gregory Binda
(74) *Attorney, Agent, or Firm* — Harness, Dickey & Pierce, P.L.C.

(57) ABSTRACT

A decoupler having an output member, a one-way clutch, a spring and a spring limiter. The spring is disposed between an output portion of the one-way clutch and the output member to bias the output portion in a predetermined rotational direction relative to the output member. The spring limiter can be configured to lock an output of the one-way clutch to the output member to transmit rotary power between the one-way clutch and the output member without stressing the spring beyond a predetermined point and/or to limit rotational movement of the output portion and an associated end of the spring relative to the output member in the predetermined rotational direction. A method for operating a decoupler is also provided.

41 Claims, 7 Drawing Sheets

(56) References Cited

U.S. PATENT DOCUMENTS

| | | | | | |
|---|---|---|---|---|---|
| 2,917,910 | A | * | 12/1959 | Herbenar | 464/60 |
| 2,968,380 | A | | 1/1961 | Sacchini | |
| 3,019,871 | A | | 2/1962 | Sauzedde | |
| RE25,229 | E | | 8/1962 | Sacchini et al. | |
| 3,059,493 | A | | 10/1962 | Wolfram | |
| 3,081,856 | A | | 3/1963 | Wolfram et al. | |
| 3,117,660 | A | * | 1/1964 | Dodwell | 464/59 X |
| 3,128,863 | A | | 4/1964 | Tomko | |
| 3,153,352 | A | | 10/1964 | Sajovec, Jr. et al. | |
| 3,249,190 | A | | 5/1966 | Botnick | |
| 3,298,486 | A | | 1/1967 | Perryman | |
| 3,618,730 | A | | 11/1971 | Mould, III | |
| 3,685,622 | A | | 8/1972 | Baer et al. | |
| 4,294,339 | A | | 10/1981 | Granger et al. | |
| 4,418,811 | A | | 12/1983 | MacDonald | |
| 4,433,765 | A | | 2/1984 | Rude et al. | |
| 4,460,076 | A | | 7/1984 | Yamada | |
| 4,763,764 | A | | 8/1988 | Smith | |
| 5,139,463 | A | | 8/1992 | Bytzek et al. | |
| 5,156,573 | A | | 10/1992 | Bytzek et al. | |
| 5,437,205 | A | | 8/1995 | Tseng | |
| 5,598,913 | A | | 2/1997 | Monahan et al. | |
| 5,638,931 | A | | 6/1997 | Kerr | |
| 5,722,909 | A | | 3/1998 | Thomey | |
| 5,879,254 | A | | 3/1999 | Tanaka | |
| 6,044,943 | A | | 4/2000 | Bytzek et al. | |
| 6,083,130 | A | * | 7/2000 | Mevissen et al. | 474/70 |
| 6,152,845 | A | | 11/2000 | Okada et al. | |
| 6,394,247 | B1 | | 5/2002 | Monahan et al. | |
| 6,394,248 | B1 | | 5/2002 | Monahan et al. | |
| 6,620,066 | B2 | | 9/2003 | Saluzzo et al. | |
| 6,637,570 | B2 | | 10/2003 | Miller et al. | |
| 6,637,571 | B2 | | 10/2003 | Arnold et al. | |
| 6,691,846 | B2 | | 2/2004 | Titus et al. | |
| 6,761,656 | B2 | | 7/2004 | King et al. | |
| 7,070,033 | B2 | | 7/2006 | Jansen et al. | |
| 7,153,227 | B2 | | 12/2006 | Dell et al. | |
| 7,207,910 | B2 | | 4/2007 | Dell et al. | |
| 2003/0098214 | A1 | | 5/2003 | Titus et al. | |
| 2003/0098215 | A1 | | 5/2003 | Miller et al. | |
| 2003/0224886 | A1 | | 12/2003 | King et al. | |
| 2004/0014540 | A1 | | 1/2004 | Dell et al. | |
| 2004/0072641 | A1 | | 4/2004 | Nakamura | |
| 2004/0104090 | A1 | | 6/2004 | Jansen et al. | |
| 2005/0250607 | A1 | | 11/2005 | Jansen et al. | |
| 2006/0144664 | A1 | | 7/2006 | Antchak et al. | |
| 2006/0148581 | A1 | | 7/2006 | Jansen et al. | |
| 2006/0264280 | A1 | | 11/2006 | Dell et al. | |

FOREIGN PATENT DOCUMENTS

| | | | | |
|---|---|---|---|---|
| SU | 735840 | | * | 5/1980 |
| WO | WO-0192746 | A | | 12/2001 |
| WO | WO-03104673 | A1 | | 12/2003 |
| WO | WO-2004011818 | A1 | | 2/2004 |
| WO | WO-2004/065811 | A1 | | 8/2004 |
| WO | WO-2004070225 | A1 | | 8/2004 |
| WO | WO-2005028899 | A1 | | 3/2005 |
| WO | WO-2005057037 | A1 | | 6/2005 |
| WO | WO-2007003052 | A1 | | 1/2007 |

* cited by examiner

DECOUPLER WITH SPRING TRAVEL LIMITER

Matter enclosed in heavy brackets [ ] appears in the original patent but forms no part of this reissue specification; matter printed in italics indicates the additions made by reissue.

CROSS-REFERENCE TO RELATED APPLICATIONS

This application is a continuation of U.S. application Ser. No. 10/581,097 filed May 31, 2006 (now U.S. Pat. No. 7,712,592), which is a national phase entry of International Patent Application PCT/CA2004/002094 filed Dec. 9, 2004, which claims priority to U.S. Provisional Patent Application No. 60/528,225 filed Dec. 9, 2003. Each of the above-referenced applications is incorporated by reference as if fully set forth in detail herein.

INTRODUCTION

The present disclosure generally relates to a decoupler with a spring travel limiter.

It is widely known in an automotive vehicle engine to transfer a portion of the engine output to a plurality of belt driven accessory components utilizing an endless serpentine belt. Typically, each component includes a pulley drivingly engaged with the belt and the belt is driven by an output pulley coupled directly to the crankshaft on the engine. The pulley of the component is rotatably mounted to a drive shaft. An example of such a belt driven accessory component is an alternator.

Internal combustion engines operate as a pulse system, constantly accelerating and decelerating and causing engine vibrations. As a result of these changing speeds, the belt driven accessory components, which are driven by the crankshaft, are continually trying to speed up and slow down. This can result in unacceptable levels of noise and vibration along with reduced component durability due to high fluctuating loads and vibrations. Additionally, rapid engine accelerations and decelerations, such as during transmission shifts and engine startup or shutdown, cause belt squeal from slippage between the belt and the pulley, as well as heavy impact loading on the belt.

It is known to provide a decoupler assembly operatively coupled between the pulley and the belt driven accessory component, such as the alternator, to allow the alternator drive shaft to "overrun" or rotate at a faster speed than the pulley and to allow the speed of the pulley to oscillate with respect to the alternator drive shaft due to oscillations in the engine speed. Examples of decouplers are disclosed in the U.S. Pat. No. 6,083,130, issued to Mevissen et al. on Jul. 4, 2000 and the U.S. Pat. No. 5,139,463, issued to Bytzek et al. on Aug. 18, 1992.

It is also known to provide a decoupler between the pulley and the belt driven accessory component to isolate vibrations therebetween reducing noise and impact loads. An example of such a decoupler is disclosed in U.S. Pat. No. 6,044,943, issued to Bytzek et al. on Apr. 4, 2000.

It remains desirable to provide a decoupler that is easier to manufacture and has better durability and functionality over conventional decoupler designs.

SUMMARY

This section provides a general summary of the disclosure, and is not a comprehensive disclosure of its full scope or all of its features.

In one form, the present teachings provide a decoupler that includes a hub, a pulley, a one-way clutch and a torsion spring. The hub is rotatable about an axis. The pulley is disposed concentrically about the hub and is rotatable about the axis. The one-way clutch has an input member and an output member and permits transmission of rotary power from the pulley to the output member, but does not permit transmission of rotary power from the output member to the pulley. The torsion spring is disposed between the output member of the one-way clutch and the hub and is configured to transmit rotary power from the output member to the hub. The output member of the one-way clutch is rotatable relative to the hub about the axis between a first position and a second position. Positioning of the output member in a first position locks the output member to the hub so that rotary power transmitted through the torsion spring is limited to a predetermined maximum torque. All rotary power transmitted through the one-way clutch is transmitted to the hub through the torsion spring when the output member is positioned between the first and second positions.

In still another form, the present teachings provide a method for operating a device that is driven by a power source. The method includes: providing a decoupler having an input member, an output member, and a one-way overrunning clutch, the input member being configured to receive rotary power from a power source, the output member being configured to output rotary power from the decoupler to the device, the one-way clutch being configured to permit transmission of rotary power in a first rotational direction to drive the output member and being configured to disengage to permit the output member to overrun the input member; resiliently coupling the input member to the output member when the rotary power transmitted from the input member to the output member has a magnitude that is less than a predetermined threshold; and inhibiting relative rotation between the input member and the output when the magnitude of the rotary power transmitted from the input member to the output member is greater than or equal to the predetermined threshold.

In still another form, the present teachings provide a decoupler that includes a hub, a pulley, a one-way clutch and a spring. The hub is rotatable about an axis. The pulley is disposed concentrically about the hub and is rotatable about the axis. The one-way clutch has an input member and an output member and allows transmission of rotary power from the pulley to the output member but does not facilitate transmission of rotary power from the hub to the pulley. The spring is disposed between the output member and the hub and is configured to transmit rotary power therebetween. The spring biases the output member in a predetermined rotational direction relative to the hub. The output member of the one-way clutch is rotatable relative to the hub about the axis between a first position and a second position. All rotary power transmitted to the hub is transmitted through the spring when the output member is positioned between the first and second positions. Rotational movement of both the spring and the output member in the predetermined rotational direction relative to the hub is inhibited when the output member is in the second position.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way. Similar or identical elements are given consistent identifying numerals throughout the various figures.

DETAILED DESCRIPTION OF THE VARIOUS EMBODIMENTS

Figure 1:
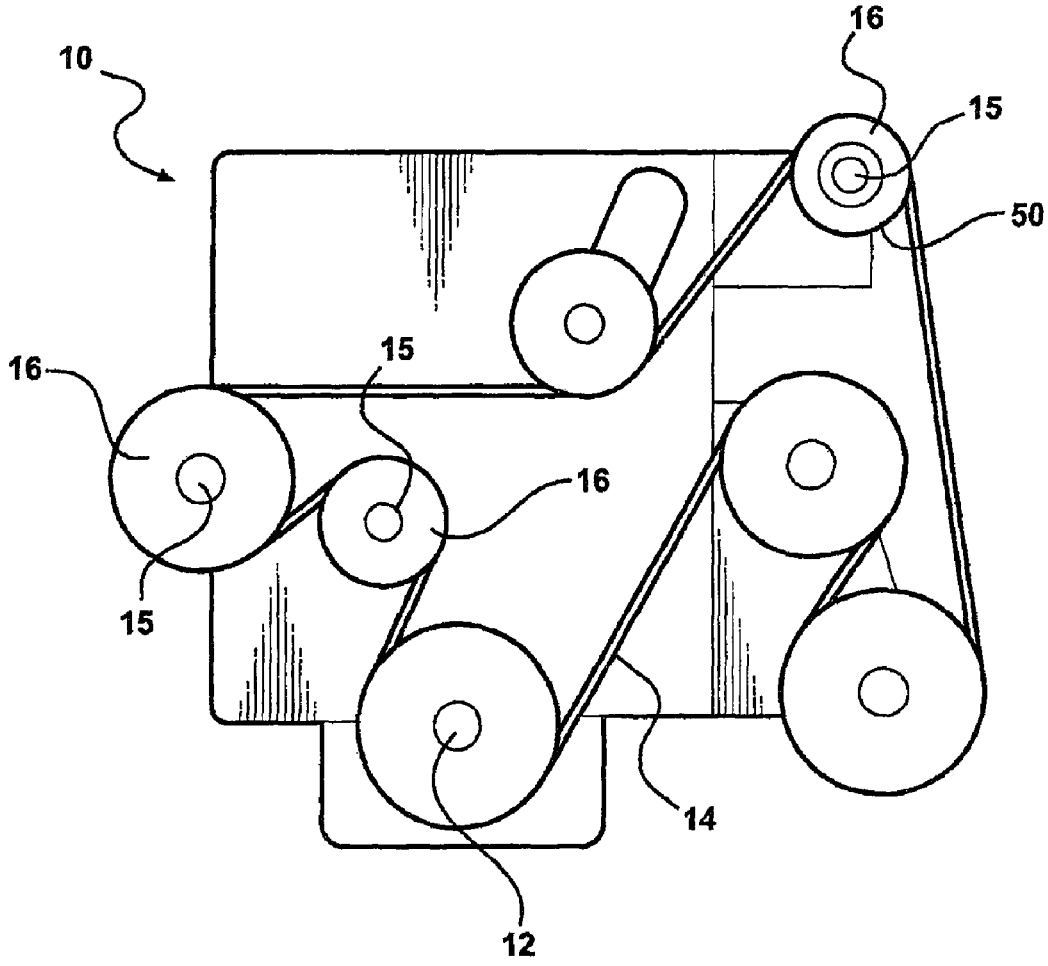
FIG. 1 is a front view of an engine incorporating a decoupler assembly constructed in accordance with the teachings of the present disclosure.

Referring to FIG. 1, an engine for an automotive vehicle is generally indicated at 10. The engine 10 includes a crankshaft 12 driving an endless serpentine belt 14, as commonly known by those having ordinary skill in the art. The engine 10 also includes a plurality of belt driven accessory components 16, such as an alternator, compressor, etc., mounted to a drive shaft 15 and driven by the belt 14. A pulley 50 is operatively coupled to each of the belt driven accessory components 16 for driving the components 16 via rotation of the pulley 50. Described in greater detail below and shown in FIG. 2, a decoupler assembly 20 is operatively assembled between the belt 14 and any one or more of the belt driven accessory components 16 for automatically decoupling the component 16 from the belt 14 when the belt 14 decelerates relative to the component 16 and allowing the speed of the belt 14 to oscillate relative to the belt driven accessory component 16. Additionally, a detailed description of the structure and function of a decoupler assembly can be found in applicant's U.S. Pat. No. 6,083,130, which issued on Jul. 4, 2000 and is incorporated herein by reference in its entirety.

Figure 2:
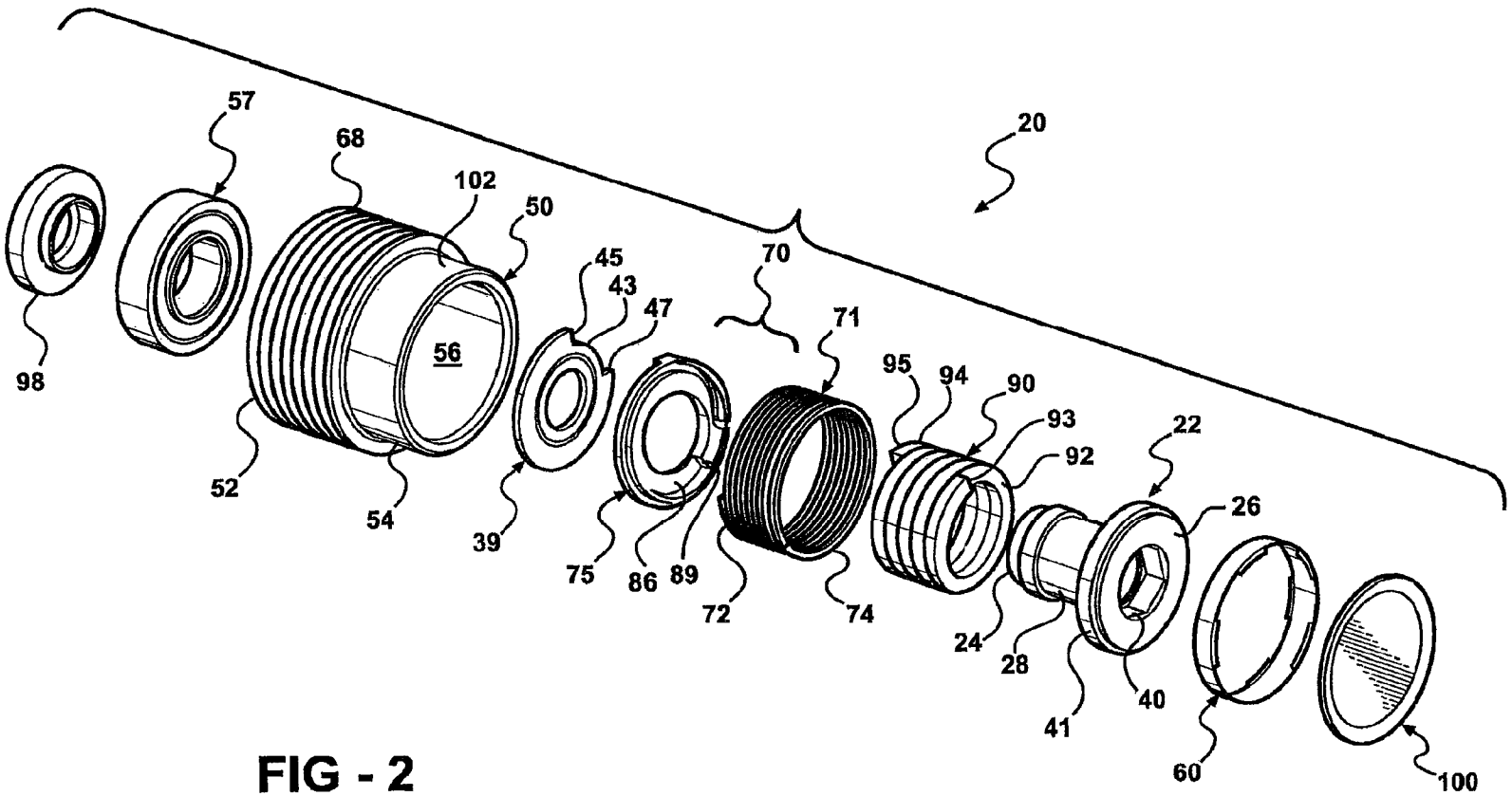
FIG. 2 is an exploded, perspective view of the decoupler assembly of FIG. 1.
Figure 4:
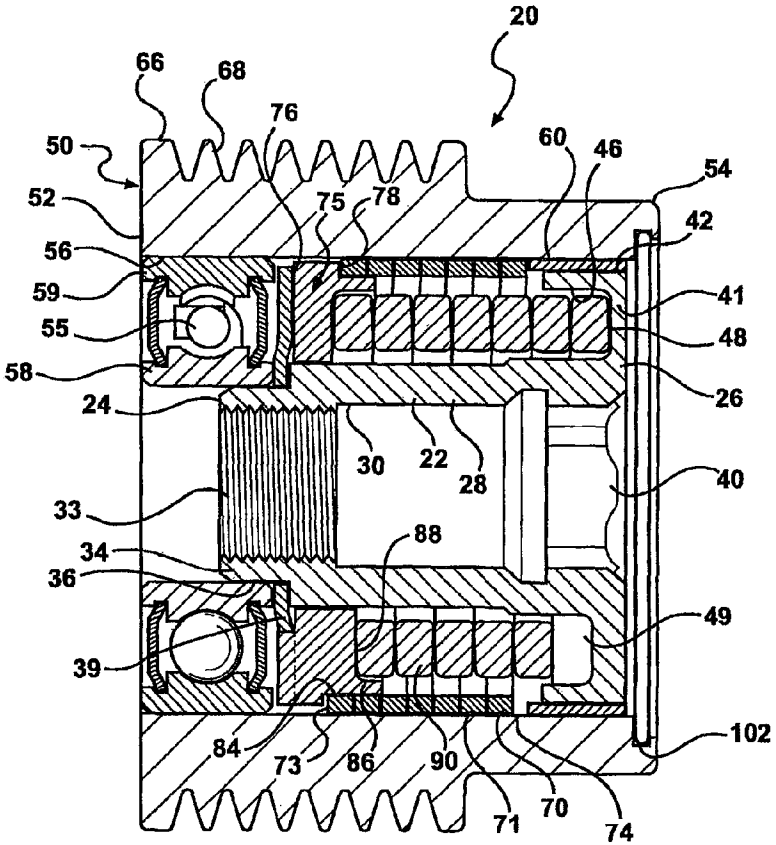
FIG. 4 is yet another cross-sectional view of a portion of the decoupler assembly of FIG. 1.
Figure 3:
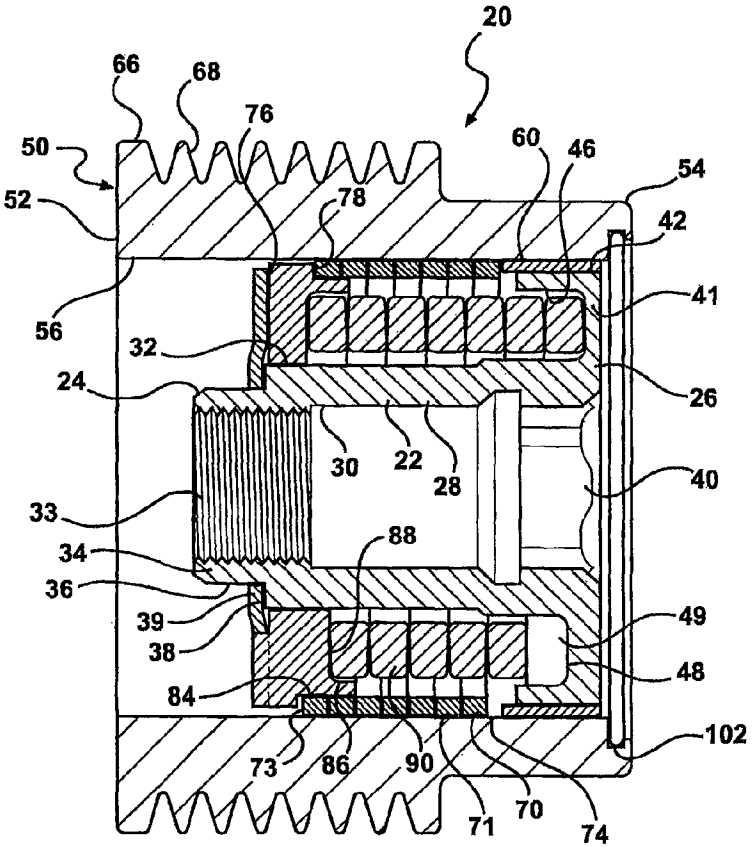
FIG. 3 is a cross-sectional view of a portion of the decoupler assembly of FIG. 1.
Figure 5:
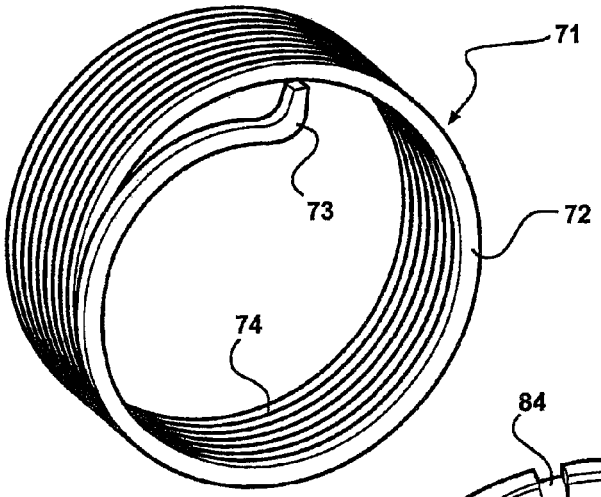
FIG. 5 is a perspective view of a portion of the decoupler assembly of FIG. 1 illustrating a clutch element in more detail.

Referring to FIGS. 2-4, the decoupler assembly 20 includes a hub 22 having opposite first 24 and second 26 ends and a generally cylindrical body 28 extending, axially therebetween. The body 28 includes opposite inner 30 and outer 32 surfaces extending between the first 24 and second 26 ends of the hub 22. The inner surface 30 includes a plurality of inner threads 33 adjacent the first end 24 for fixedly securing the hub 22 to the drive shaft 15 for mounting the belt driven accessory component 16. A reduced diameter portion 34 is formed in the first end 24. The reduced diameter portion 34 includes an outer mounting surface 36 having a smaller outer diameter than the outer surface 32 of the body 28. An abutment surface 38 opposite the second end 26 extends generally radially between the outer mounting surface 36 and outer surface 32 of the body 28. An annular thrust plate 39 is seated and fixedly secured, such as by press-fit, on the outer mounting surface 36 against the abutment surface 38. The thrust plate 39 preferably includes a slot, or notch, 43 formed on its peripheral edge to mate with a carrier 75, as will be discussed in more detail below.

A socket 40 is formed in the second end 26 for receiving a suitable tool therein for rotatably threading the hub 22 onto the drive shaft 15 for fixed rotation therewith. An annular first flange 41 extends radially outwardly from the body 28 adjacent the second end 26. The first flange 41 includes an outer flange surface 42 having a larger outer diameter than outer surface 32 of the body 28. A generally helical first slot 46 is formed between the outer flange surface 42 and the body 28 defining a first helically ramped locating surface 48 in the annular first flange 41 terminating at an abutment wall 49 and facing the first end 24 of the hub 22.

A generally cylindrical pulley 50 is rotatably journaled to the hub 22. More specifically, the pulley 50 extends between opposite first 52 and second 54 ends. The pulley 50 includes an inner cylindrical surface 56 extending between the first 52 and second 54 ends. The pulley 50 includes an outer periphery 66 with a plurality of V-shaped grooves 68 formed therein for engaging and guiding the belt 14. A ball bearing member 57 is press fit and coupled between the pulley 50 and the hub 22. The bearing member 57 includes an inner race 58 fixedly secured to a portion of the outer mounting surface 36 of the hub 22 and an outer race 59 secured to a portion of the inner surface 56 adjacent the first end 52 of the pulley 50. A plurality of ball bearings 55 is seated between the inner 58 and outer 59 races of the bearing member 57. The thrust plate 39 is preferably secured in place axially between the inner race 58 and hub 22 when assembled. A cylindrical bushing 60 is journal mounted between the inner surface 56 of the pulley 50 and the outer flange surface 42 of the hub 22.

Referring to FIGS. 2-7, a one-way clutch assembly 70 is operatively coupled between the hub 22 and the pulley 50. The clutch assembly 70 includes a clutch spring 71 and a carrier 75 operatively coupled to the hub 22. The clutch spring 71 includes a plurality of helical coils 72 extending between a bent or hooked proximal end 73 and an opposite distal end 74. Preferably, the clutch spring 71 is formed from an uncoated, spring steel material and has a non-circular cross-section to improve frictional contact with the inner surface 56 of the pulley 50. Most preferably, the cross-section of clutch spring 71 is rectangular or square. The clutch spring 71 is fitted into frictional engagement with the inner surface 56 of the pulley 50. Preferably, a lubricant is applied to minimize wear between the clutch spring 71 and the inner surface 56 of the pulley 50.

Figure 6:
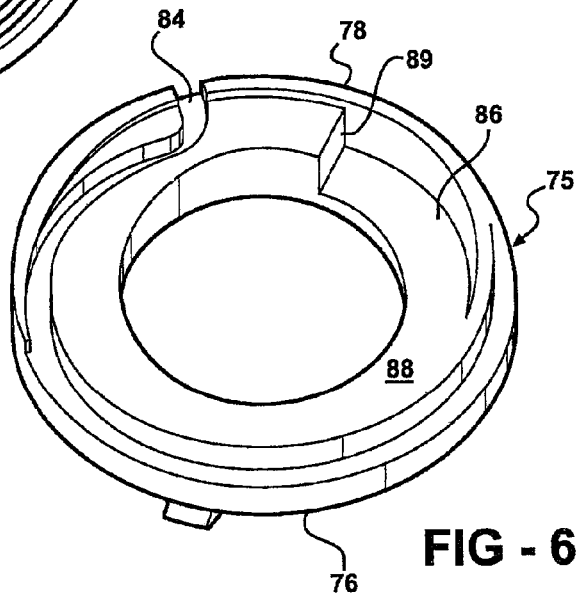
FIG. 6 is a perspective view of a portion of the decoupler assembly of FIG. 1 illustrating a carrier in more detail.
Figure 7:
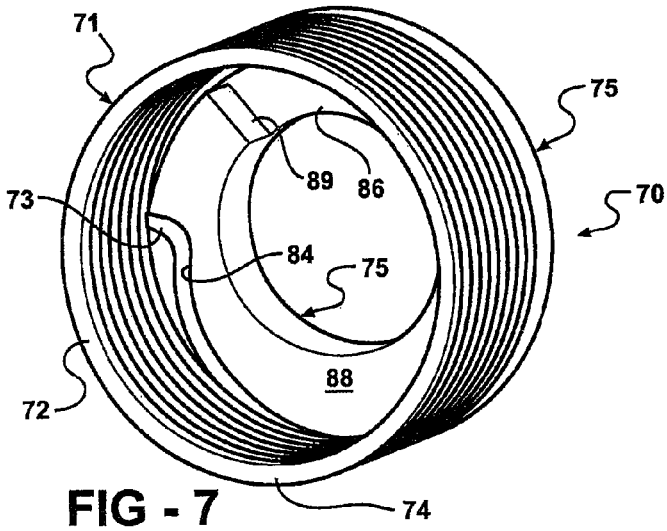
FIG. 7 is a perspective view of a portion of the decoupler assembly of FIG. 1 illustrating the clutch element assembled on the carrier.
Figure 8:
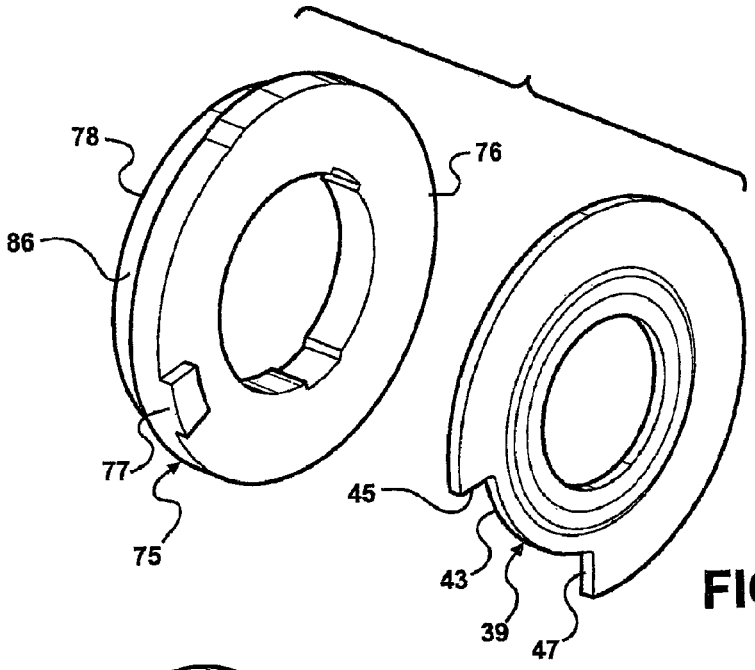
FIG. 8 is an exploded, perspective view of a portion of the decoupler assembly of FIG. 1 illustrating a slotted thrust plate and the carrier with an anti-ramp up boss.

Referring to FIGS. 6-8, the carrier 75 is generally ring shaped and extends axially between opposite first and second sides 76, 78. An anti-ramp up boss 77 is formed projecting outwardly from the first side 76 of the carrier 75 and is configured to mate with the slot 43 formed in the thrust plate 39, when assembled. A hooked slot 84 is formed in the second side 78 of the carrier 75 and is configured to retain the hooked proximal end 73 of the clutch spring 71. A generally helical second slot 86 is also formed in the second side 78 of the carrier 75 defining a second helically ramped locating surface 88 terminating at an abutment wall 89 and generally opposing the first locating surface 48 formed in the hub 22.

Referring to FIGS. 2-4, a helical torsion spring 90 extends between a hub end 92 and a carrier end 94. The torsion spring 90 is axially compressed between the first 48 and second 88 locating surfaces for transferring torque between the hub 22 and the carrier 75. More specifically, the hub end 92 of the torsion spring 90 is retained in the first slot 46 of the hub 22 and seated against the mating helically ramped locating surface 48. Similarly, the carrier end 94 of the torsion spring 90 is retained in the second slot 86 of the carrier 75 and seated against the mating helically ramped locating surface 88. The torsion spring 90 further includes hub distal end 93 and a carrier distal end 95. The hub distal end 93 abuts the abutment wall 49 in the hub 22 and the carrier distal end 95 abuts the abutment wall 89 in the carrier 75 to transfer torque between the carrier 75 and hub 22. Axial forces due to the compression of the torsion spring 90 retains the first side 76 of the carrier 75 in abutting engagement with the thrust washer 39. The torsion spring 90 also allows relative movement between the carrier 75 and the hub 22 to accommodate changes in the speed of the pulley 50 due to generally oscillating changes in the operating speed of the engine. The torsion spring 90 and the clutch spring 71 are coiled in opposite directions.

In prior applications of decouplers, as the torsion spring 90 winds and unwinds due to changes in engine speed, the spring 90 presses against the abutment wall 89 associated with the slot 86 formed in the carrier 75 to transmit torque from the engine. As the driving force associated with the engine reverses, as in an over run condition, the spring 90 attempts to move away from the abutment wall 89 and ramp-up the helical surface 88 as the only forces holding it in place are friction forces between the spring 90 and carrier 75 and the load contained by the compression in the spring 90 between the carrier 75 and the hub 22. Such movement of the spring 90 can cause excessive wear of the carrier 75 and lead to failure of the assembly. Additionally, the overloading of the spring 90 against the abutment wall 89 may also lead to failure of the spring 90.

Figure 9:
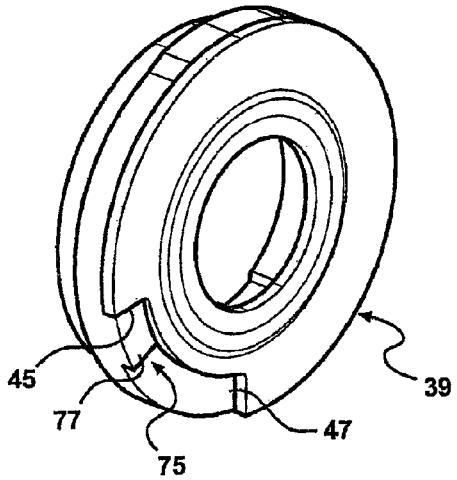
FIG. 9 is a perspective view of the thrust plate and the carrier of the decoupler assembly of FIG. 1 in an anti-ramp up position.
Figure 10:
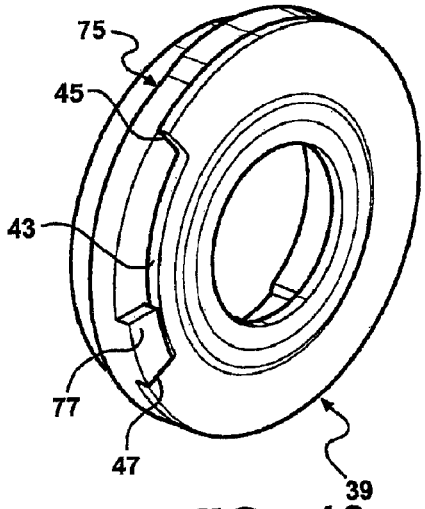
FIG. 10 is a perspective view of the thrust plate and the carrier of the decoupler assembly of FIG. 1 in a torque lock up position.
Figure 11:
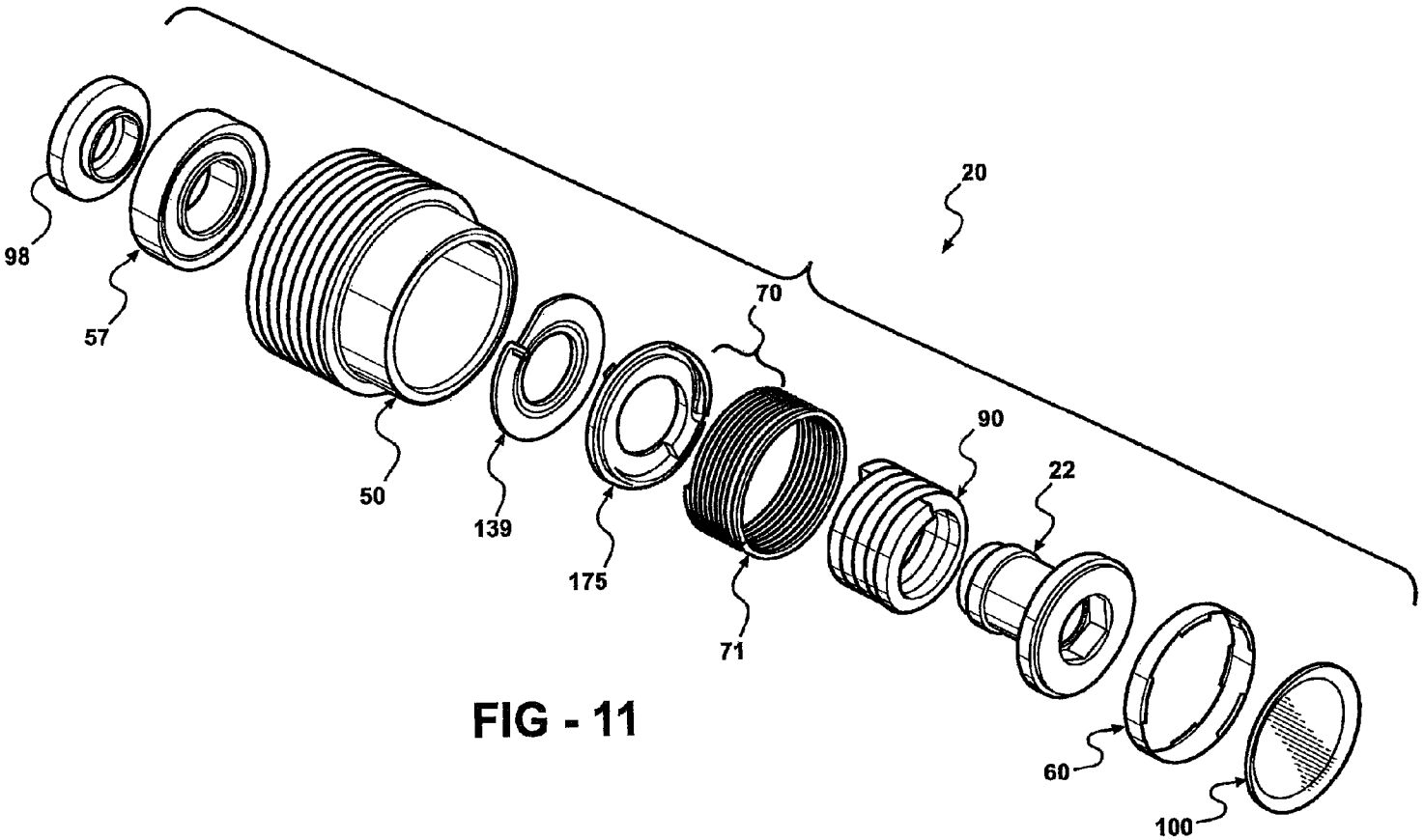
FIG. 11 is an exploded perspective view of another decoupler assembly constructed in accordance with the teachings of the present disclosure.
Figure 12:
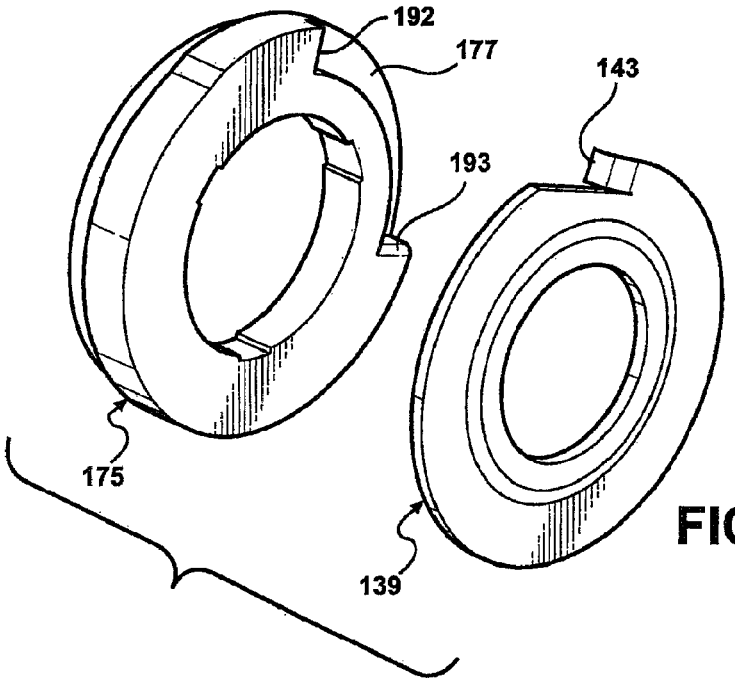
FIG. 12 is an exploded, perspective view of a portion of the decoupler assembly of FIG. 11, illustrating a tabbed thrust plate and a carrier with an anti-ramp up slot.

To alleviate the above outlined problems, the anti-ramp up boss 77 prevents ramp-up or the relative movement of a torsion spring 90 relative to the carrier 75. Specifically, the anti-ramp up boss 77 travels within the slot 43 of the thrust plate 39 as the thrust plate 39 and carrier 75 rotate relative to each other to accommodate changes in speed of the pulley 50. The anti-ramp up boss 77 travels between opposing sides of the slot 43 which define boundaries for a torque lock up position and a ramp-up position. The anti-ramp up position is shown in FIG. 9 and is defined as the position in which the anti-ramp up boss 77 engages a first side 45, or anti-ramp up side, of the slot 43 formed in the thrust washer 39 preventing the spring 90 from backing away from the abutment wall 89 associated with the carrier 75. The torque lock up position of the carrier 75 and thrust plate 39 is shown in FIG. 10 and is defined as the position in which torsional deflection of the spring 90 due to rotation is stopped by the interaction of the anti-ramp up boss 77 with a second side 47, or torque limiting side, of the slot 43 formed in the thrust washer 39.

When assembled, the spring 90 is placed about the body 28 of the hub 22 and compressed against and between the ramped locating surface 48 in the slot 46 of the hub 22 and the ramped locating surface 88 in the slot 86 of the carrier 75, as described above. The carrier 75 and thrust plate 39 are aligned such that the anti-ramp up boss 77 is seated within the slot 43 of the thrust washer 39. The bearing member 57 is then attached to hold the thrust washer 39 in place with respect to the hub 22.

A first cap 98 is assembled to the first end 52 of the pulley 50 and a second cap 100 is assembled to a flange 102 formed in the second end 54 of the pulley 50 for sealing and preventing contaminants from entering the decoupler assembly 20 and for retaining the lubricant within the decoupler assembly 20.

In operation, the engine 10 is started and the pulley 50 is accelerated and rotated in a driven direction by the belt 14 driven by the engine 10. Acceleration and rotation of the pulley 50 in the driven direction relative to the hub 22 creates friction between the inner surface 56 of the pulley 50 and preferably all of the coils 72 of the clutch spring 71. It should be appreciated that the clutch spring 71 will function even where at the onset at least the end coil 74 of the clutch spring 71 is frictionally engaged with the inner surface 56 of the pulley 50. The clutch spring 71 is helically coiled such that the friction between the inner surface 56 of the pulley 50 and at least the end coil 74 would cause the clutch spring 71 to expand radially outwardly toward and grip the inner surface 56 of the pulley 50. Continued rotation of the pulley 50 in the driven direction relative to the hub 22 would cause a generally exponential increase in the outwardly radial force applied by the coils 72 against the inner surface 56 until all of the coils 72 of the clutch spring 71 become fully brakingly engaged with the pulley 50. When the clutch spring 71 is fully engaged with the inner surface 56, the rotation of the pulley 50 is fully directed toward rotation of the drive shaft 15 of the belt driven accessory 16. Additionally, centrifugal forces help to retain the clutch spring 71 in braking engagement with the inner surface 56 of the pulley 50.

The rotational movement of the carrier 75 in the driven direction is transferred to the hub 22 by the torsional spring 90 such that generally the carrier 75, thrust plate 39, hub 22, and the drive shaft 15 from the belt driven accessory 16 rotate together with the pulley 50. At a point where the maximum design torque (or spring twist angle) has been reached, the anti-ramp up boss 77 engages the torque lock up side 47 of the slot 43 in the thrust washer 39 in the torque lock up position described above to prevent over torque on the spring 90 and possible failure. The torque lock up position is a limit for travel of the boss 77 that oscillates between the torque limiting and anti-ramp up positions during normal operation. The boss 77 may contact the anti ramp-up side regularly during normal operation while seldom contacting the torque limiting side. Additionally, the torsional spring 90 resiliently allows relative movement between the carrier 75 and the hub 22 to dampen, or isolate, oscillations in the speed of the pulley 50 due to corresponding oscillations in the operating speed of the engine 10.

When the pulley 50 decelerates, the hub 22 driven by the inertia associated with the rotating drive shaft 15 and the rotating mass within the belt driven accessory 16 will initially "overrun" or continue to rotate in the driven direction at a higher speed than the pulley 50. More specifically, the higher rotational speed of the hub 22 relative to the pulley 50 causes the clutch spring 71 to contract radially relative to the inner surface 56 of the pulley 50. The braking engagement between the clutch spring 71 and the pulley 50 is relieved, thereby allowing overrunning of the hub 22 and drive shaft 15 from the belt driven accessory 16 relative to the pulley 50. The anti-ramp up boss 77 of the carrier 75 engages the anti-ramp up side 45 of the slot 43 formed in the thrust plate 39 in the anti-ramp up position described above, preventing the spring 90 from separating from the abutment wall 89 in the carrier 75 and selectively prevent rotation of the spring 90 relative to the carrier 75 and hub 22. The coils 72 may remain frictionally engaged with the inner surface 56 while the pulley 50 decelerates relative to the clutch assembly 70 and the hub 22. The coils 72 of the clutch spring 71 begin to brakingly reengage the inner surface 56 as the pulley 50 accelerates beyond the speed of the hub 22.

Figure 13:
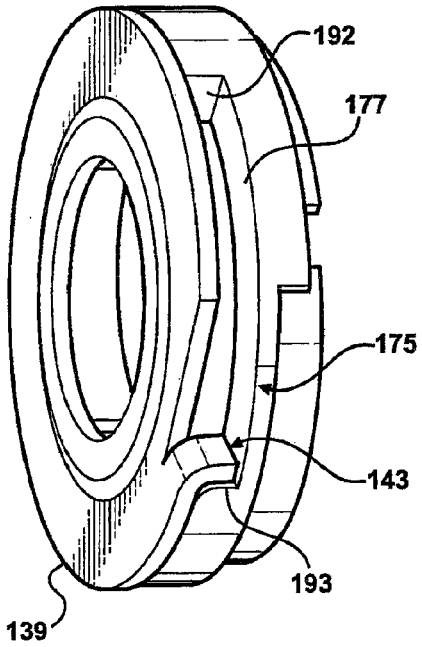
FIG. 13 is a perspective view of the tabbed thrust plate and the carrier of the decoupler assembly of FIG. 11 in a torque lock-up position.
Figure 14:
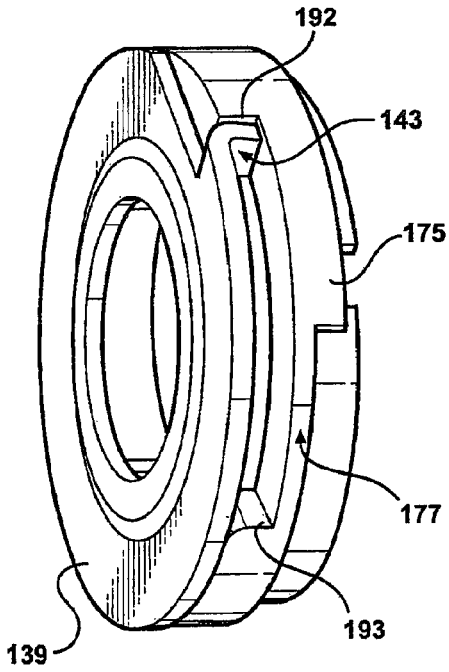
FIG. 14 is a perspective view of the tabbed thrust plate and the carrier of the decoupler assembly of FIG. 11 in an anti-ramp up position. Corresponding reference numerals indicate corresponding parts throughout the several views of the drawings.

Referring to FIGS. 11-14, there is shown an alternative embodiment of the decoupler assembly 20 of the present invention. The alternative embodiment is identical in all respects to the first embodiment with the exception of the carrier 175 and thrust plate 139. The carrier 175 of the alternative embodiment contains an anti-ramp up slot 177 that mates with a tab 143 formed on the thrust plate 139. The slot 177 extends between a first torque lock-up side 192 and a second anti-ramp up side 193 for limiting the rotational travel of the tab 143 therein and thus the carrier 175 and spring 90 relative to the thrust plate 139. Essentially the slot 43 on the thrust plate 39 and boss 77 of the carrier 75 of the first embodiment have been transposed to the slot 177 of the carrier 175 and the tab 143 of the thrust plate 139 in the alternative embodiment. As with the previously described first embodiment, the tab 143 and slot 177 have torque lock up and anti-ramp up positions as shown in FIGS. 13 and 14 that correspond to those defined above.

It should be appreciated that the decoupler assembly may be coupled between the pulley and drive shaft of any accessory component 16, such as an alternator or compressor, which are driven by the endless serpentine drive element or belt 14. Alternatively, the decoupler assembly may also be coupled between the drive shaft and pulley of the crankshaft which is driven by the engine.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A decoupler comprising:

a hub that is rotatable about an axis;

a pulley disposed concentrically about the hub and rotatable about the axis;

a one-way clutch having an input member and an output member, the one-way clutch permitting transmission of rotary power from the pulley to the output member, but not from the output member to the pulley; and a torsion spring disposed between the output member of the one-way clutch and the hub to transmit rotary power from the output member to the hub;

wherein the output member of the one-way clutch is rotatable relative to the hub about the axis between a first position and a second position, wherein positioning of the output member in a first position locks the output member to the hub so that rotary power transmitted through the torsion spring is limited to a predetermined maximum torque, and wherein all rotary power transmitted through the one-way clutch is transmitted to the hub through the torsion spring when the output member is positioned between the first and second positions.

2. The decoupler of claim 1, wherein the torsion spring is received axially over the hub.

3. The decoupler of claim 2, wherein the torsion spring is axially compressed between the output member and the hub.

4. The decoupler of claim 3, further comprising a thrust washer fixed to the hub and abutting the output member.

5. The decoupler of claim 4, wherein the first and second positions are established by contact between the thrust washer and the output member.

6. The decoupler of claim 1, wherein the one-way clutch comprises a wrap spring that is mounted to the output member.

7. The decoupler of claim 1, wherein a diameter of the torsion spring tends to increase as a magnitude of the rotary power increases to the predetermined maximum torque.

8. The decoupler of claim 1, wherein rotation of the torsion spring relative to the hub and the output member is inhibited when the output member is in the second position.

9. A decoupler comprising:

a hub that is rotatable about an axis;

a pulley disposed concentrically about the hub and rotatable about the axis;

a one-way clutch having an input member and an output member, the one-way clutch allowing transmission of rotary power from the pulley to the output member but not facilitating transmission of rotary power from the hub to the pulley;

a spring disposed between the output member and the hub and configured to transmit rotary power therebetween, the spring biasing the output member in a predetermined rotational direction relative to the hub;

wherein the output member of the one-way clutch is rotatable relative to the hub about the axis between a first position and a second position, wherein all rotary power transmitted to the hub is transmitted through the spring when the output member is positioned between the first and second positions, and wherein rotational movement of both the output member and an end of the spring that is engaged to the output member in the predetermined rotational direction relative to the hub is inhibited when the output member is in the second position.

10. The decoupler of claim 9, wherein the spring is received axially over the hub.

11. The decoupler of claim 10, wherein the spring is axially compressed between the output member and the hub.

12. The decoupler of claim 11, further comprising a thrust washer fixed to the hub and abutting the output member.

13. The decoupler of claim 12, wherein the first and second positions are established by contact between the thrust washer and the output member.

14. The decoupler of claim 9, wherein the one-way clutch comprises a wrap spring that is mounted to the output member.

15. The decoupler of claim 9, wherein a diameter of the spring tends to increase as a magnitude of the rotary power increases to the predetermined maximum torque.

*16. A decoupler comprising:*

*a hub that is rotatable about an axis;*

*a pulley disposed concentrically about the hub and rotatable about the axis; and*

*an isolator received between and coupling the hub and the pulley, the isolator having a torsionally-resilient coupling coupled in series with a one-way clutch assembly, the one-way clutch assembly having an input member and an output member, the one-way clutch assembly permitting transmission of rotary power in a direction from the pulley to the output member, but not in a direction from the output member to the pulley;*

*wherein a portion of the isolator is rotatable relative to the hub about the axis between a first position and a second position, wherein positioning of the portion of the isolator in the second position locks the isolator so that rotary power transmitted through the torsionally-resilient coupling is limited to a predetermined maximum torque, and wherein all rotary power transmitted through the isolator is transmitted to the hub through the torsionally-resilient coupling when the portion of the isolator is not positioned in the second position.*

*17. The decoupler of claim 16, wherein the torsionally-resilient coupling comprises a torsion spring.*

*18. The decoupler of claim 17, wherein the one-way clutch assembly comprises a wrap spring.*

*19. The decoupler of claim 18, wherein the wrap spring is mounted to the output member.*

*20. The decoupler of claim 16, wherein the torsionally-resilient coupling is axially compressed.*

*21. The decoupler of claim 20, further comprising a thrust washer fixed to the hub and abutting the output member.*

*22. The decoupler of claim 21, wherein the first and second positions are established by contact between the thrust washer and the output member.*

*23. The decoupler of claim 16, wherein the one-way clutch assembly comprises a wrap spring.*

*24. The decoupler of claim 16, wherein the portion of the isolator comprises the output member of the one-way clutch assembly.*

*25. The decoupler of claim 16, wherein the isolator is oriented in the decoupler such that rotary power is transmitted from the pulley to the one-way clutch assembly into the torsionally resilient coupling and to the hub when the portion of the isolator is not positioned in the second position.*

*26. A decoupler assembly for transferring torque between a drive shaft and an endless drive element of an automotive engine, the decoupler assembly comprising:*

*a hub adapted to be fixedly secured to the shaft, the hub extending axially between a first hub end and a second hub end;*

*a pulley disposed concentrically about the hub and adapted to be drivingly engaged with the endless drive element;*

*a bearing between the hub and the pulley, the bearing supporting the pulley for rotation about a rotational axis of the hub;*

*an isolator received between and coupling the hub and the pulley, the isolator having a torsion spring coupled in series with a one-way clutch assembly, the one-way clutch assembly permitting transmission of rotary power in a direction from the pulley to the output member, but not in a direction from the hub to the pulley; and*

*an anti-ramp up mechanism having a first anti-ramp up feature, which is coupled to an end of the torsion spring for rotation therewith, and a second anti-ramp up feature that is engageable with the first anti-ramp up feature, the first and second anti-ramp up features permitting rotation of the end of the torsion spring about the rotational axis in a first rotational direction from a first position to a second position, the first and second anti-ramp up features cooperating to inhibit rotation of the end of the torsion spring about the rotational axis in a second, opposite rotational direction away from the first position.*

*27. The decoupler assembly of claim 26, wherein the spring is axially compressed.*

*28. The decoupler assembly of claim 26, wherein one of the first and second anti-ramp up features comprises a slot and the other one of the first and second anti-ramp up features comprises a post that is received in the slot.*

*29. The decoupler assembly of claim 26, wherein the second anti-ramp up feature is non-rotatably coupled to the hub.*

*30. The decoupler assembly of claim 26, wherein the one-way clutch assembly comprises a wrap spring.*

*31. The decoupler of claim 26, wherein the isolator is oriented in the decoupler such that rotary power is transmitted from the pulley to the one-way clutch assembly into the torsionally resilient coupling and to the hub when the end of the spring is disposed between the first and second positions.*

*32. A decoupler comprising:*

*a hub;*

*a pulley rotatably journalled to the hub;*

*an isolator coupling the pulley to the hub, the isolator comprising a torsion spring connected in series with a one-way clutch via a carrier, wherein the one-way clutch permits rotary power to flow from the pulley to the hub but not from the hub to the pulley;*

*wherein the carrier includes an abutment wall and the torsion spring includes a distal end which presses against the abutment wall, the carrier further including one of a boss and a slot, the one of the boss and the slot having an anti-ramp up side and a torque lock-up side, wherein contact between a first side of a complementary feature and the anti-ramp up side limits an angular position of the carrier along a first rotational direction so as to prevent the distal end of the torsion spring from backing away from the carrier abutment wall, and wherein contact between a second side of the complementary feature and the torque lock-up side limits the angular position of the carrier along a second rotational direction so as to prevent twist of the torsion spring beyond a design spring twist angle.*

*33. The decoupler of claim 32, wherein the complementary feature is the other one of the boss and the slot.*

*34. The decoupler of claim 32, wherein the one-way clutch comprises a wrap spring.*

*35. The decoupler of claim 32, wherein the complementary feature is coupled to a structure that contacts a member of the clutch so that rotary power is transmitted directly between the one-way clutch and the structure.*

*36. The decoupler of claim 35, wherein the structure is coupled to the hub for rotation therewith.*

*37. A decoupler comprising:*

*a hub;*

*a pulley;*

*an isolator coupling the pulley to the hub, the isolator comprising a torsion spring connected in series with a*

*one-way clutch assembly, the one-way clutch assembly being configured to permit transmission of rotary power from the pulley to the hub to drive the hub in a first rotational direction and being configured to interrupt transmission of rotary power from the hub to the pulley to permit the hub to overrun the pulley in the first rotational direction;*

*wherein the one-way clutch assembly includes an abutment wall and the torsion spring includes a distal end which presses against the abutment wall, the one-way clutch further including one of a boss and a slot, the one of the boss and the slot having an anti-ramp up side and a torque lock-up side, wherein contact between a first side of a complementary feature and the anti-ramp up side limits an angular position of the abutment wall along a first rotational direction so as to prevent the distal end of the torsion spring from backing away from the abutment wall, and wherein contact between a second side of the complementary feature and the torque lock-up side limits twist of the torsion spring beyond a design spring twist angle.*

*38. The decoupler of claim 37, wherein the complementary feature is the other one of the boss and the slot.*

*39. The decoupler of claim 37, wherein the one-way clutch comprises a wrap spring.*

*40. The decoupler of claim 37, wherein the complementary feature is coupled to a structure that contacts a member of the clutch so that rotary power is transmitted directly between the one-way clutch and the structure.*

*41. The decoupler of claim 40, wherein the structure is coupled to the hub for rotation therewith.*

* * * * *